United States Patent
Moon et al.

(10) Patent No.: US 10,642,384 B2
(45) Date of Patent: May 5, 2020

(54) ZONE IDENTIFICATIONS ON INPUT DEVICES

(71) Applicant: HEWLETT-PACKARD DEVELOPMENT COMPANY, L.P., Houston, TX (US)

(72) Inventors: Tony Moon, Houston, TX (US); Ricky Thomas Burks, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/077,324

(22) PCT Filed: Dec. 19, 2016

(86) PCT No.: PCT/US2016/067594
§ 371 (c)(1),
(2) Date: Aug. 10, 2018

(87) PCT Pub. No.: WO2018/118013
PCT Pub. Date: Jun. 28, 2018

(65) Prior Publication Data
US 2019/0056797 A1 Feb. 21, 2019

(51) Int. Cl.
| | |
|---|---|
| G06F 3/038 | (2013.01) |
| G06F 3/0338 | (2013.01) |
| G06F 3/0354 | (2013.01) |
| G06F 3/147 | (2006.01) |
| G06F 3/033 | (2013.01) |

(52) U.S. Cl.
CPC .............. *G06F 3/038* (2013.01); *G06F 3/033* (2013.01); *G06F 3/0338* (2013.01); *G06F 3/03547* (2013.01); *G06F 3/147* (2013.01); *G06F 2203/0381* (2013.01)

(58) Field of Classification Search
CPC ...... G06F 3/038; G06F 3/03547; G06F 3/147; G06F 3/0338; G06F 3/033; G06F 2203/0381
See application file for complete search history.

(56) References Cited

U.S. PATENT DOCUMENTS

| | | |
|---|---|---|
| 5,408,060 A | 4/1995 | Muurinen |
| 7,154,480 B2 | 12/2006 | Iesaka |
| 9,092,056 B2 | 7/2015 | Myers et al. |
| 9,141,211 B2 | 9/2015 | Feng et al. |
| 9,665,206 B1 * | 5/2017 | Missig ................. G06F 3/0416 |
| 2008/0094350 A1 | 4/2008 | Pickover |
| 2012/0050158 A1 | 3/2012 | Ahn |
| 2013/0132903 A1 | 5/2013 | Krishnaswamy |

(Continued)

OTHER PUBLICATIONS

"Mini Backlit Led Illuminated Keyboard with Pointing Device", Fentek Industries, Retrieved from Internet: http://www.fentek-ind.com/mini_backlit_keyboard.htm#.WBLrWeJ97IU, Oct. 28, 2016, 3 pages.

*Primary Examiner* — Rodney Amadiz
(74) *Attorney, Agent, or Firm* — HPI Patent Department

(57) ABSTRACT

In one example method, a computing device determines whether there is engagement of a first input device of the computing device and, in response to an engagement of the first input device, the computing device identifies, via a visual indication on a second input device of the computing device, a first zone that can be used with the first input device to operate the computing device.

15 Claims, 4 Drawing Sheets

(56) References Cited

U.S. PATENT DOCUMENTS

| | | | |
|---|---|---|---|
| 2013/0155018 A1 | 6/2013 | Dagdeviren | |
| 2014/0085209 A1 | 3/2014 | Runde et al. | |
| 2014/0267147 A1* | 9/2014 | Buelow | G06F 3/044 345/174 |
| 2014/0267180 A1* | 9/2014 | Buelow | G06F 3/03545 345/179 |
| 2015/0009161 A1* | 1/2015 | Park | G06F 3/046 345/173 |
| 2015/0302757 A1* | 10/2015 | Bansal | G09B 11/04 434/164 |

* cited by examiner

ZONE IDENTIFICATIONS ON INPUT DEVICES

BACKGROUND

The emergence and popularity of mobile computing has made portable computing devices, due to their compact design and light weight, a staple in today's marketplace. Within the mobile computing realm, notebook computers, or laptops, are one of the most widely used devices and generally employ a clamshell-type design consisting of two members connected together at a common end. In most cases, a first or display member is utilized to provide a viewable display to a user while a second or base member includes an area for user input (e.g., trackpad and keyboard).

DETAILED DESCRIPTION

A pointing device, such as a mouse, or the trackpad found on the notebook computer, allows a user to input spatial data to the notebook computer. Movements of the pointing device, or movements of fingers on the trackpad, are echoed on the viewable display by movements of a pointer/cursor and other visual changes. Common gestures performed by pointing devices include point and click, and drag and drop. Upon moving the pointer/cursor to its appropriate place on the viewable display, such gestures may be initiated by a button press, click, or tap, based on the particular pointing device (e.g., tap on a trackpad without buttons). As users may prefer to perform such gestures differently, some notebook computers may include additional pointing devices, such as a pointing stick, which is a pressure-sensitive nub, typically mounted in the keyboard of the notebook computer, which operates by sensing the force applied by the user. As an example, the pointing stick can be used by pushing the pointing stick with the fingers in the general direction the user wants the cursor to move.

Examples disclosed herein provide zones on an input device of a computing device, to be used with another input device of the computing device, to operate the computing device. As will be further described, the zones on the input device (e.g., trackpad) are identified via a visual indication, in response to an engagement of the other input device (e.g., pointing stick), or when the other input device is determined to being used. Similarly, the visual indication is removed from the trackpad when there is no longer engagement of the pointing stick, or when the pointing stick is no longer being used. As trackpads are doing away with physical buttons, including the physical buttons that corresponded to pointing stick usage, the zones that are enabled and visually indicated, in response to engagement of the pointing stick, provide support for users to continue to use pointing sticks to operate computing devices such as notebook computers.

Figure 1:
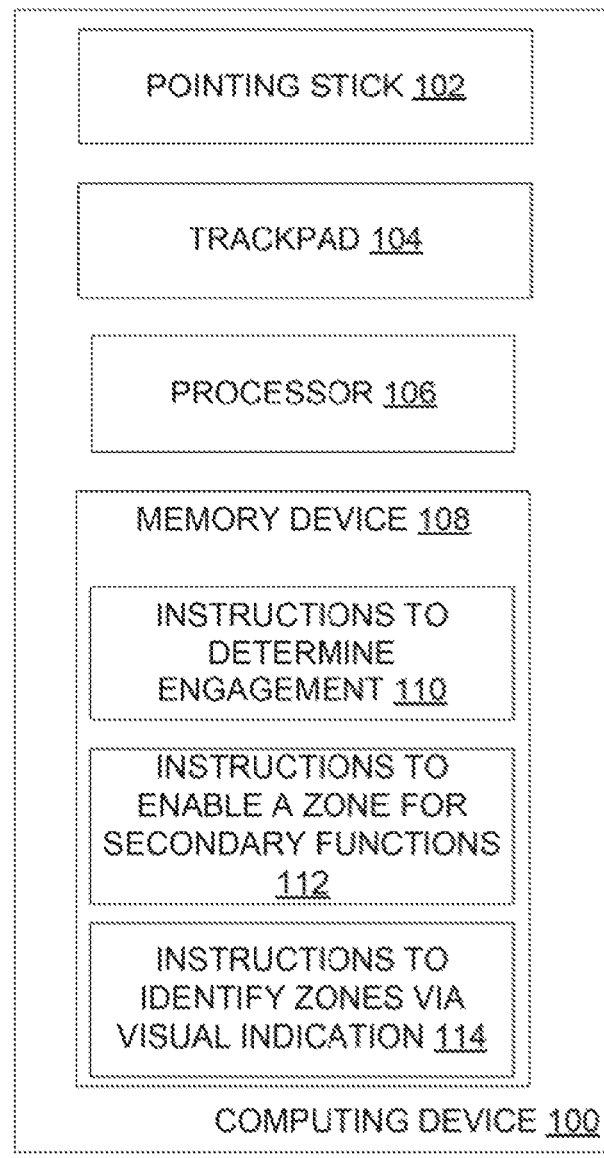
FIG. 1 illustrates a computing device that includes multiple input devices for op rating the computing device, according to an example.

With reference to the figures, FIG. 1 illustrates a con sting device 100 that includes multiple input devices for operating the computing device 100, according to an example. As an example, the input devices may correspond to pointing devices, such as a pointing stick 102 and a trackpad 104, as described above. As an example, the computing device 100 may correspond to a notebook computer, and the pointing stick 102 and trackpad 104 may be located on the base member of the notebook computer, allowing for a user to control data found on the display member of the notebook computer. However, in addition to notebook computers, the pointing stick 102 and trackpad 104 can be found on other computing devices or peripheral devices, such as a keyboard.

The computing device 100 depicts a processor 106 and a memory device 108 and, as an example of the computing device 100 performing its operations, the memory device 108 may include instructions 110-114 that are executable by the processor 106. Thus, memory device 108 can be said to store program instructions that, when executed by processor 106, implement the components of the computing device 100. The executable program instructions stored in the memory device 108 include, as an example, instructions to determine engagement (110), instructions to enable a zone for secondary functions (112), and instructions to identify zones via visual indication (114).

Instructions to determine engagement (110) represent program instructions that when executed by the processor 106 cause the computing device 100 to determine whether there is engagement of the pointing stick 102. As an example, determining whether there is engagement of the pointing stick 102 may provide an indication whether the pointing stick 102 is being used to operate the computing device 100. Determining whether there is engagement may involve detecting whether a user makes contact with the pointing stick 102. As described above, as the pointing stick is pressure-sensitive, when force is applied to the pointing stick 102, the computing device 100 may determine that there is engagement of the pointing stick 102, and that it is likely being used. As an example, the pointing stick 102 may be capacitive, and the computing device 100 may detect that a user is making contact with the pointing stick 102 when the user touches the capacitive pointing stick 102. By being capacitive, the computing device 100 may determine when there is engagement of the pointing stick 102, even prior to any force being applied to pointing stick 102 by the user to operate the computing device 100. This may be beneficial, to promptly indicate when the user is potentially intending to use the pointing stick 102.

Instructions to enable a zone for secondary functions (112) represent program instructions that when executed by the processor 106 cause the computing device 100 to enable a zone on the trackpad 104 for handling secondary functions while the pointing stick 102 is being used to operate the computing device 100. As an example, the zone on the trackpad 104 for handling secondary functions may be similar to the secondary button found on a computer mouse, which can be used, for example, to display a menu with different options, depending on the site/app that the pointer/cursor is in currently. This zone on the trackpad 104 may not be desirable when the pointing stick 102 is not in use. For example, if the trackpad 10 is being used to operate the computing device 100 (and not using the pointing stick 102), if the zone on the trackpad 104 for handling secondary functions remains enabled, the user may tap in the zone, intending the tap for a primary function (e.g., making a selection), but a secondary function would result (e.g., displaying a menu). As a result, the zone on the trackpad 104 for handling secondary functions may be enabled only when engagement of the pointing stick 102 is determined, as described above.

Instructions to identify zones via visual indication (114) represent program instructions that when executed by the processor 106 cause the computing device 100, in response to an engagement of the pointing stick 102, identify via a visual indication, on the trackpad 104, zones that can be used with the pointing stick 102 to operate the computing device 100. One of the zones may correspond to the zone described above for handling secondary functions. At least another zone may be similar to the main button on the computer mouse, for handling primary functions. A number of other zones may be identified by visual indication, according to an example. The visual identification provided to identify the zones on the trackpad 104 upon engagement of the pointing stick 102, as described above, provides a way for users to easily locate the zones on the trackpad 104, which correspond to virtual buttons that may be used with the pointing stick 102 for operating the computing device 100. The visual indication for identifying the zones may vary. As an example, the visual indication may include lighting up the zones on the trackpad 104. Each zone may be lit separately, or even be lit by different colors or shades. Instead of completely lighting up each zone, the visual indication may include only an outline of each zone being lit, in order to be identified.

Memory device 108 represents generally any number of memory components capable of storing instructions that can be executed by processor 106. Memory device 108 is non-transitory in the sense that it does not encompass transitory signal but instead is made up of at least one memory component configured to store the relevant instructions. As a result, the memory device 108 may be a non-transitory computer-readable storage medium. Memory device 108 may be implemented in a single device or distributed across devices. Likewise, processor 106 represents any number of processors capable of executing instructions stored by memory device 108. Processor 106 may be integrated in a single device or distributed across devices. Further, memory device 108 may be fully or partially integrated in the same device as processor 106, or it may be separate but accessible to that device and processor 106.

In one example, the program instructions 110-114 can be part of an installation package that when installed can be executed by processor 106 to implement the components of the computing device 100. In this case, memory device 108 may be a portable medium such as a CD, DVD, or flash drive or a memory maintained by a server from which the installation package can be downloaded and installed. In another example, the program instructions may be part of an application or applications already installed. Here, memory device 108 can include integrated memory such as a hard drive solid state drive, or the like.

Figure 2A:
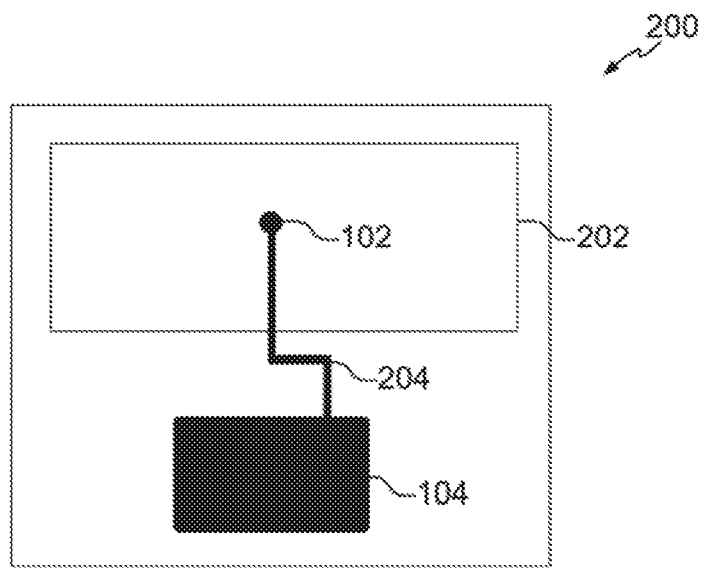
FIGS. 2A-C provide an illustration of zones that may appear on a trackpad, in response to engagement of a pointing stick, according to an example.
Figure 2B:
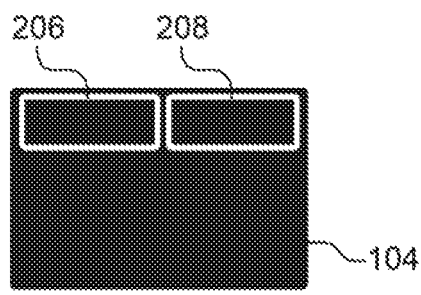
Figure 2C:
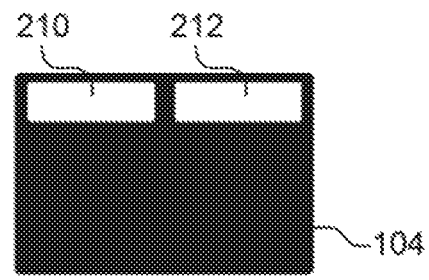

FIGS. 2A-C provide an illustration of the zones that may appear on the trackpad 104, in response to engagement of the pointing stick 102, according to an example. As an example, the zones may correspond to virtual buttons that become available to be used with the pointing slick 102, in response to engagement of the pointing stick 102. Referring to FIG. 2A, the pointing stick 102 and the trackpad 104 may be found on a base member 200 of a notebook computer. The pointing stick 102 may be mounted in a keyboard 202, for example, embedded between the G, H, and B keys. As an example, the pointing stick 102 and track ad 104 may be wired to each other at 204, for handling communications between the input devices. Referring to FIGS. 2B-C, in response to engagement of the pointing stick 102, visual identification may be provided to identify zones or virtual buttons on the trackpad 104, which may be used with the pointing stick 102 to operate the notebook computer. As described above, the virtual buttons provide support for users to continue to use pointing sticks to operate computing devices, as physical buttons from trackpads may be removed.

Referring to FIG. 2B, the visual identification may include an outline of each zone being lit, to provide virtual buttons 206 and 208. Referring to FIG. 2C, rather than lighting up the outline of each zone, each zone may be completely lit, to provide virtual buttons 210 and 212. Additional virtual buttons may be provided as well, and are not limited to the two illustrated. As described above, each virtual button may have a different function. For example, the button on the left (virtual button 206 or 210) may be used for handling primary functions, similar to the main button on a computer mouse. The button on the right (virtual button 208 or 212) may be used handling secondary functions, similar to the secondary button found on the computer mouse. As described above, the virtual button on the right may be enabled, in response to engagement of the pointing stick 102. Once there is no longer engagement of the pointing stick 102, the virtual button on the right may be disabled and the visual identification of all the virtual buttons may be removed (e.g., see FIG. 2A). As a result, the whole trackpad 104 may be used for handling primary functions, similar to the main button on the computer mouse.

Figure 3:
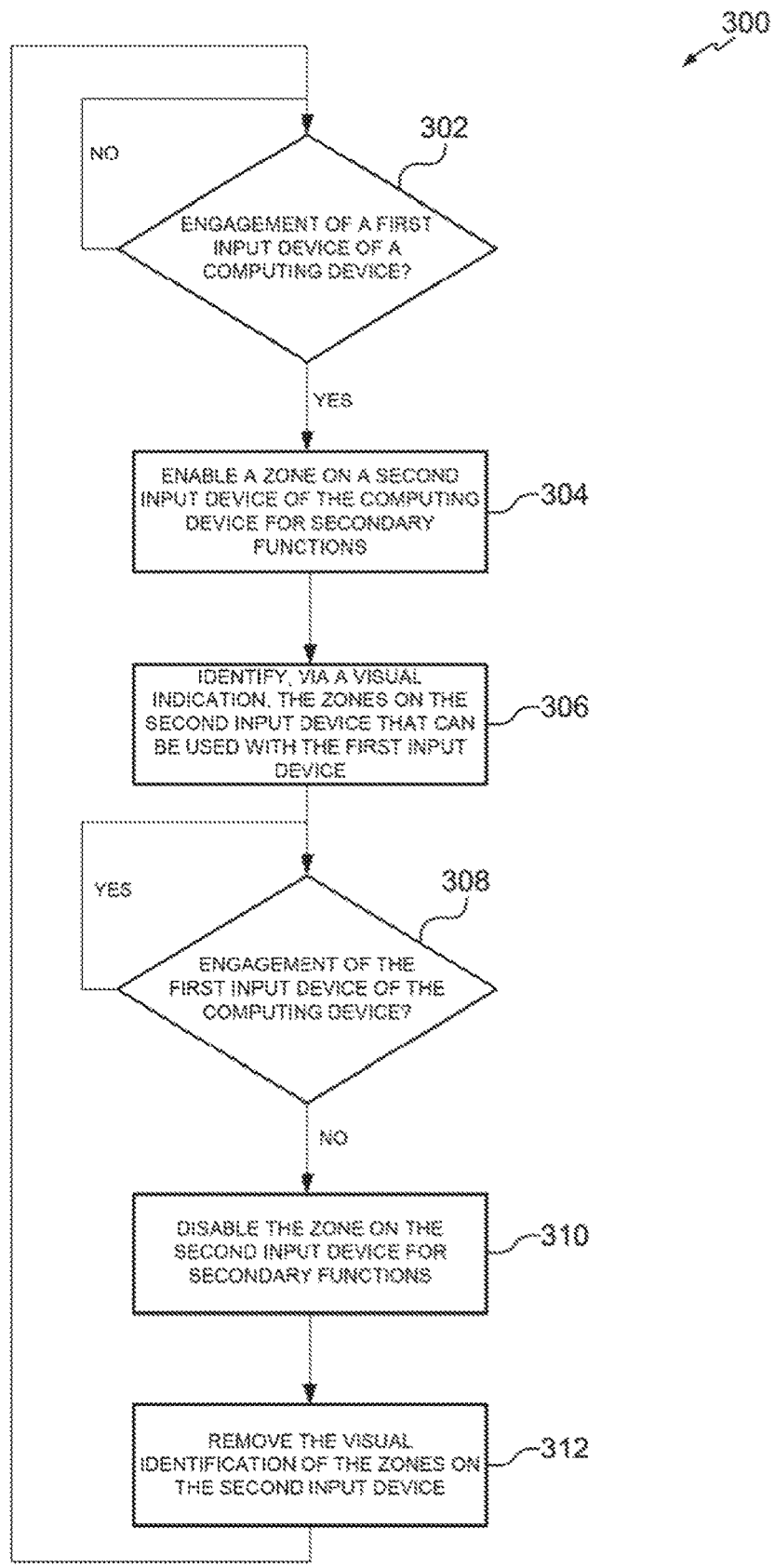
FIG. 3 illustrates a method of operation at a computing device for providing zones on an input device of the computing device, in response to engagement of another input device of the computing device, according to an example.

FIG. 3 illustrates a method of operation 300 at a computing device for providing zones (or virtual buttons, as described above) on an input device of the computing device, in response to engagement of another input device of the computing device, according to an example. As will be further described, the virtual buttons on the input device (e.g., trackpad) can be used with the other input device (e.g., pointing stick) to operate the computing device. In discussing FIG. 3, reference may be made to the example computing device 100 illustrated in FIG. 1. Such reference is made to provide contextual examples and not to limit the manner in which method 300 depicted by FIG. 3 may be implemented.

Method 300 begins at 302, where the computing device determines whether there is engagement of a first input device of the computing device. As an example, the first input device may correspond to the pointing stick 102 of FIG. 1. As described above, with regards to the pointing stick 102, determining whether there is engagement of the first input device may provide an indication whether the first input device is being used to operate the computing device. Determining whether there is engagement may involve detecting whether a user makes contact with the first input device. With regards to pointing sticks, when force is applied to the pointing stick, the computing device may determine that there is engagement of the pointing stick, and that it is likely being used. As described, pointing sticks may be capacitive, to detect touch and, as a result, engagement of the pointing stick.

At 304, response to an engagement of the first input device, the computing ice enables a zone on a second input device of the computing device for handling secondary functions, while the first input device is being used to operate the computing device. As an example, the second input device may correspond to the trackpad 104 of FIG. 1.

As an example, the zone on the second input device for handling secondary functions may be similar to the secondary button found on a computer mouse, which can be used, for example, to display a menu with different options, depending on the site/app that the pointer/cursor is in currently.

At 306, in response to an engagement of the first input device, the commuting device identifies, via a visual indication on the second input device, zones that can be used with the first input device to operate the computing device. One of the zones may correspond to the zone described above for handling secondary functions (at 304). At least another zone may be similar to the main button on the computer mouse, for handling primary functions. The visual indication for identifying the zones may vary. As an example, the visual indication may include lighting up the zones on the second input device. Each zone may be lit separately, or even be lit by different colors or shades. Instead of completely lighting up each zone, the visual indication may include only an outline of each zone being lit, in order to be identified.

While the first input device continues to be used to operate the computing device, the virtual buttons identified by the visual indication on the second input device may remain lit, in order for a user to easily identify the virtual buttons for usage. Therefore, at 308, if engagement of the first input device remains, the computing device will continue to provide the visual indication of the zones on the second input device. However, once there is no longer engagement of the first input device (e.g., the first input device is no longer being used), the method proceeds to 310.

At 310, once there is no longer engagement of the first input device of the computing device, the computing device disables the zone on the second input device for secondary functions. By disabling the zone, on the second input device for secondary functions, the second input device, including the above-described zone on the second input device, may be used for handling primary functions, similar to the main button on the computer mouse. Referring to computing device 100, once it is determined that there is no longer engagement of the pointing stick 102 (i.e., the pointing stick 102 is likely no longer being used), the computing device 100 disables the zone on the trackpad 104 for handling secondary functions. As a result, when the user operates the computing device 100 via the trackpad 104 instead, the whole trackpad 104 can be used for handling primary functions.

At 312, in addition to disabling the zone on the second input device for secondary functions, the computing device removes the visual identification of the zones on the second input device once there is no longer engagement of the first input device of the computing device. As a result, the visual indication of the virtual buttons appear on the second input device only when there is engagement of the first input device, or when it is determined that the first input device is being used.

Figure 4:
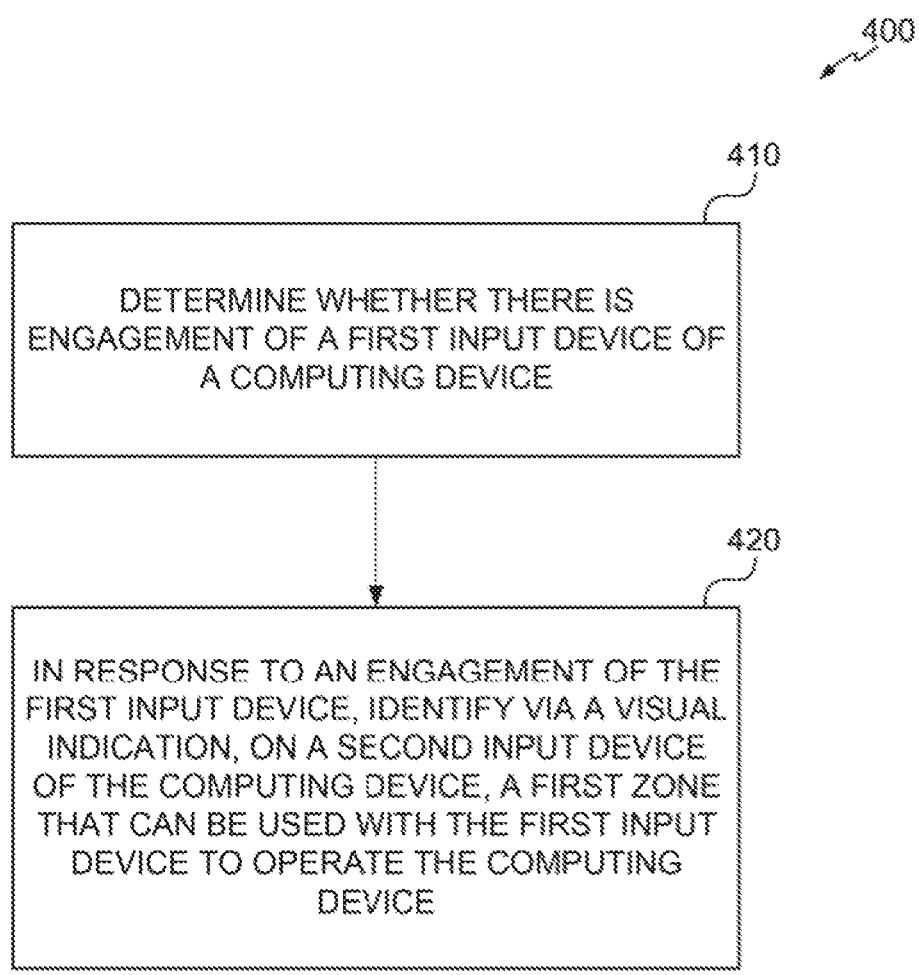
FIG. 4 is a flow diagram in accordance with an example of the present disclosure.

FIG. 4 is a flow diagram 400 of steps taken by a computing device to implement a method for providing zones on an input device of the computing device, in response to engagement of another input device of the computing device, according to an example, according to an example. In discussing FIG. 4, reference may be made to the example computing device 100 illustrated in FIG. 1. Such reference is made to provide contextual examples and not to limit the manner in which the method depicted by FIG. 4 may be implemented.

At 410, the computing device determines whether there is engagement of a first input device of the computing device. As an example, the computing device determines whether there is engagement of the first input device by detecting whether a user makes contact with the first input device. Referring to the pointing stick 102 of FIG. 1, as the pointing stick may be pressure-sensitive, when force is applied to the pointing stick 102, the computing device 100 may determine that mere is engagement of the pointing stick 102, and that it is likely being used. As an example, the pointing stick 102 may be capacitive, and the computing device 100 may detect that a user is making contact with the pointing stick 102 when the user touches the capacitive pointing stick 102.

At 420, in response to an engagement of the first input device, the computing device identifies, via a visual indication on a second input device of the computing device, a first zone that ca be used with the first input device to operate the computing device. As an example, the visual indication may include lighting up the first zone on the second input device or lighting up an outline of the first zone. In response to the first input device no longer being used, the computing device removes identification of the first zone on the second input device by removing the visual indication of the lighting of the first zone.

As an example, in addition to identifying the first zone on the second input device, the computing device may identify additional zones on the second input device to be used with the first input device to operate the computing device. For example, the computing device may enable a second zone on the second input device, in response to the engagement of the first input device. As an example, the second zone corresponds to secondary functions that can be used with the first input device to operate the computing device. These secondary functions may correspond to the secondary button found on a computer mouse. In addition to enabling the second zone, the computing device lights up the second zone, in addition to any other zones, in response to the engagement of the first input device. In response to the first input device no longer being used, for example, when there is no longer engagement of the first input device, the computing device disables the second zone on the second input device for the secondary functions, and removes the visual indication of the zones on the second input device.

Although the flow diagram of FIG. 4 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method comprising:
   determining whether there is engagement of a first input device of a computing device, wherein the first input device is integral to a member of the computing device; and
   in response to an engagement of the first input device, identifying, via a visual indication on a second input device of the computing device, a first zone that can be used to execute operations performed by the first input device, wherein the second input device is integral to the member of the computing device.

2. The method of claim 1, wherein the visual indication comprises lighting up the first zone on the second input device.

3. The method of claim 2, comprising:
   in response to the first input device no longer being used, removing identification of the first zone on the second input device, wherein removing the identification comprises removing the visual indication of the lighting of the first zone.

4. The method of claim 1, wherein the visual indication comprises lighting up an outline of the first zone on the second input device.

5. The method of claim 1, comprising:
   enabling a second zone on the second input device, in response to the engagement of the first input device, wherein the second zone corresponds to secondary functions that can be used with the first input device to operate the computing device; and
   disabling the second zone on the second input device for the secondary functions, when the first input device is determined to not being used.

6. The method of claim 5, wherein:
   the visual indication comprises lighting up the first and second zones on the second input device, in response to the engagement of the first input device, and
   removing the visual indication of the first and second zones on the second input device when the first input device is determined to not being used.

7. The method of claim 1, wherein determining whether there is engagement of the first input device comprises detecting whether a user is to make contact with the first input device.

8. The method of claim 7, wherein the first input device is capacitive and detecting comprises detecting when the user is to touch the capacitive first input device.

9. A computing device comprising:
   a pointing stick integral to a member of the computing device;
   a trackpad integral to the member of the computing device; and
   a processor to:
      determine whether there is engagement of the pointing stick, wherein determining whether there is engagement of the pointing stick comprises detecting whether a user is to make contact with the pointing stick; and
      in response to an engagement of the pointing stick, identify, via a visual indication on the trackpad, a first zone that can be used to execute operations performed by the pointing stick.

10. The computing device of claim 9, wherein the pointing stick is capacitive, and the processor to detect whether the user is to make contact comprises detecting when the user is to touch the capacitive pointing stick.

11. The computing device of claim 9, wherein the visual indication comprises the processor to light up the first zone on the trackpad.

12. The computing device of claim 11, wherein in response to the pointing stick no longer being used, the processor is to remove identification of the first zone on the trackpad, wherein removing the identification comprises removing the visual indication of the lighting of the first zone.

13. A non-transitory computer-readable storage medium comprising program instructions which, when executed by a processor, to cause the processor to:
   determine whether there is engagement of a first input device of a computing device, wherein the first input device is integral to a member of the computing device; and
   in response to an engagement of the first input device:
      identify, via a visual indication on a second input device of the computing device, zones that can be used to execute operations performed by the first input device, wherein the second input device is integral to the member of the computing device; and
      enable one of the zones on the second input device to initiate secondary functions that can be used to execute the operations performed by the first input device.

14. The non-transitory computer-readable storage medium of claim 13, wherein the program instruction to determine whether there is engagement of the first input device causes the processor to detect whether a user is to make contact with the first input device.

15. The non-transitory computer-readable storage medium of claim 13, wherein in response to the first input device no longer being used, comprising program instructions to cause the processor to:
   disable the zone on the second input device to initiate the secondary functions; and
   remove the visual indication of the zones on the second input device.

* * * * *